United States Patent
Keskitalo (10) Patent No.: US 9,014,035 B2
(45) Date of Patent: Apr. 21, 2015

(54) METHOD AND APPARATUS FOR PROVIDING MANAGEMENT OF MEASUREMENT REPORTING AFTER CELL CHANGE

(75) Inventor: Ilkka Antero Keskitalo, Oulu (FI)

(73) Assignee: Nokia Corporation, Espoo (FI)

( * ) Notice: Subject to any disclaimer, the term of this patent is extended or adjusted under 35 U.S.C. 154(b) by 271 days.

(21) Appl. No.: 13/638,743

(22) PCT Filed: Apr. 1, 2010

(86) PCT No.: PCT/IB2010/051443
§ 371 (c)(1),
(2), (4) Date: Oct. 1, 2012

(87) PCT Pub. No.: WO2011/121398
PCT Pub. Date: Oct. 6, 2011

(65) Prior Publication Data
US 2013/0021940 A1    Jan. 24, 2013

(51) Int. Cl.
*H04L 1/00*     (2006.01)
*H04L 12/26*    (2006.01)
(Continued)

(52) U.S. Cl.
CPC .......... *H04W 36/0088* (2013.01); *H04W 24/10* (2013.01)

(58) Field of Classification Search
CPC ....... H04L 47/10; H04L 43/50; H04W 80/04; H04W 88/06; H04W 28/04; H04W 72/04
USPC .......... 370/252, 328, 329, 331; 455/436, 437, 455/439, 442
See application file for complete search history.

(56) References Cited

U.S. PATENT DOCUMENTS

2006/0217152 A1    9/2006  Fok et al.
2007/0205745 A1    9/2007  Chen et al.
(Continued)

FOREIGN PATENT DOCUMENTS

CN    101690325 A       3/2010
WO    2008/157717 A1   12/2008
(Continued)

OTHER PUBLICATIONS

"Delivery of HO Command", 3GPP TSG-RAN WG 2 meeting #58-bis, R2-072786, Agenda: 5.3.1, Qualcomm Europe, Jun. 25-29, 2007, pp. 1-3.
(Continued)

*Primary Examiner* — Ronald Abelson
(74) *Attorney, Agent, or Firm* — Mintz Levin Cohn Ferris Glovsky and Popeo, P.C.

(57) ABSTRACT

A method for providing management of measurement reports after a cell handover may include receiving, at a source cell, an indication that a handover of a mobile terminal is to be conducted from the source cell to a target cell, causing provision of information indicative of a measurement configuration employed by the mobile terminal with respect to the source cell to the target cell in which the measurement configuration is descriptive of reports for communication parameters measured at the mobile terminal based on transmissions associated with the source cell, and directing communication of a continuity indicator to the mobile terminal to indicate to the mobile terminal whether to continue providing measurement information to the target cell based on the measurement configuration. A corresponding apparatus and computer program product are also provided.

20 Claims, 7 Drawing Sheets

(51) Int. Cl.
*H04W 4/00* (2009.01)
*H04W 36/00* (2009.01)
*H04W 24/10* (2009.01)

(56) References Cited

U.S. PATENT DOCUMENTS

| | | |
|---|---|---|
| 2008/0057894 A1 | 3/2008 | Aleksic et al. |
| 2008/0130584 A1* | 6/2008 | Pani et al. .................... 370/332 |
| 2008/0167041 A1* | 7/2008 | Wang et al. .................. 455/436 |

FOREIGN PATENT DOCUMENTS

| | | |
|---|---|---|
| WO | WO-2008157717 A1 | 12/2008 |
| WO | 2009/072521 A1 | 6/2009 |
| WO | WO-2009072521 A1 | 6/2009 |

OTHER PUBLICATIONS

"Consideration on CP Solution of Minimization of Drive Test", 3GPP TSG-RAN WG2 #68, R2-096600, Agenda: 4.2.2.2, Huawei, Nov. 9-13, 2009, 4 pages.

"Measurement Configuration IE During Handover Preparation", 3GPP TSG RAN WG2 #64, R2-086675, Agenda: 6.2.1.3, Huawei, Nov. 10-14, 2008, 4 pages.

International Search Report and Written Opinion received for corresponding Patent Cooperation Treaty Application No. PCT/IB2010/051443, dated Dec. 14, 2010, 13 pages.

3GPP TSG-RAN WG2 #68, "Consideration on CP Solution of Minimization of Drive Test", R2-096600, Nov. 2009.

3GPP TSG RAN WG2 meeting #58-bis, "Considerations on RRC re-establishment", R2-072785, Jun. 2007.

3GPP TSG RAN WG2 #64, "Measurement configuration IE during handover preparation", R2-086675, Nov. 2008.

* cited by examiner

METHOD AND APPARATUS FOR PROVIDING MANAGEMENT OF MEASUREMENT REPORTING AFTER CELL CHANGE

RELATED APPLICATION

This application was originally filed as PCT Application No. PCT/IB2010/051443 filed Apr. 1, 2010.

TECHNOLOGICAL FIELD

Embodiments of the present invention relate generally to wireless communication technology and, more particularly, relate to an apparatus, method and a computer program product for providing a measurement reporting scheme for employment after a cell change.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. In order to provide easier or faster information transfer and convenience, telecommunication industry service providers are developing improvements to existing networks. For example, the evolved universal mobile telecommunications system (UMTS) terrestrial radio access network (E-UTRAN) is currently being developed. The E-UTRAN, which is also known as Long Term Evolution (LTE) or 3.9G, is aimed at upgrading prior technologies by improving efficiency, lowering costs, improving services, making use of new spectrum opportunities, and providing better integration with other open standards.

One advantage of E-UTRAN which continues to be shared with other preceding telecommunication standards is the fact that users are enabled to access a network employing such standards while remaining mobile. Thus, for example, users having mobile terminals equipped to communicate in accordance with such standards may travel vast distances while maintaining communication with the network. By providing access to users while enabling user mobility, services may be provided to users while the users remain mobile. However, the mobility of users requires the network to provide continuity of service to the mobile users by enabling a user's mobile terminal to be handed over between different serving stations within corresponding different cells or service areas. To verify and test radio network deployment and operation, drive tests had been conducted in the past. Drive testing typically involved the use of specific measurement tools that could be driven through an area to collect data for network operation verification. Thus, manual testing and verification of radio network operation has been common.

For existing and especially for newer networks (e.g., LTE and future networks), it may be desirable to reduce the need for drive testing to reduce manual testing of networks and therefore reduce operational costs. Accordingly, studies regarding support for minimization of drive tests (MDT) are currently popular which aim to utilize commercial terminals for reporting of relevant measurement results in order to avoid separate manual testing with special test equipment and involvement of operator personnel.

BRIEF SUMMARY

A method, apparatus and computer program product are therefore provided that may provide improved measurement reporting after cell changes occur. The improved measurement reporting may be used in connection with MDT so that reporting used in connection with MDT may be conducted in a manner that may provide unambiguous terminal operation while limiting the required complexity of terminal implementation.

In one example embodiment, a method of providing management of measurement reporting after a cell change is provided. The method may include receiving, at a source cell, an indication that a handover of a mobile terminal is to be conducted from the source cell to a target cell, causing provision of information indicative of a measurement configuration employed by the mobile terminal with respect to the source cell to the target cell in which the measurement configuration is descriptive of reports for communication parameters measured at the mobile terminal based on transmissions associated with the source cell, and directing communication of a continuity indicator to the mobile terminal to indicate to the mobile terminal whether to continue providing measurement information to the target cell based on the measurement configuration.

In another example embodiment, a computer program product for providing management of measurement reporting after a cell change is provided. The computer program product may include at least one computer-readable storage medium having computer-executable program code instructions stored therein. The computer-executable program code instructions may include program code instructions for receiving, at a source cell, an indication that a handover of a mobile terminal is to be conducted from the source cell to a target cell, causing provision of information indicative of a measurement configuration employed by the mobile terminal with respect to the source cell to the target cell in which the measurement configuration is descriptive of reports for communication parameters measured at the mobile terminal based on transmissions associated with the source cell, and directing communication of a continuity indicator to the mobile terminal to indicate to the mobile terminal whether to continue providing measurement information to the target cell based on the measurement configuration.

In another example embodiment, an apparatus for providing management of measurement reporting after a cell change is provided. The apparatus may include at least one processor and at least one memory including computer program code. The at least one memory and the computer program code may be configured to, with the at least one processor, cause the apparatus to perform at least receiving, at a source cell, an indication that a handover of a mobile terminal is to be conducted from the source cell to a target cell, causing provision of information indicative of a measurement configuration employed by the mobile terminal with respect to the source cell to the target cell in which the measurement configuration is descriptive of reports for communication parameters measured at the mobile terminal based on transmissions associated with the source cell, and directing communication of a continuity indicator to the mobile terminal to indicate to the mobile terminal whether to continue providing measurement information to the target cell based on the measurement configuration.

In another example embodiment, a method of providing management of measurement reporting after a cell change is provided. The method may include receiving a continuity indicator at a mobile terminal configured based on a measurement configuration employed with respect to a source cell, and determining, based on the continuity indicator, whether to continue providing measurement information to a target cell in accordance with the measurement configuration responsive to handover of the mobile terminal from the source cell to the target cell. The measurement configuration may be descriptive of reports for communication parameters measured at the mobile terminal based on transmissions associated with the source cell.

In another example embodiment, an apparatus for providing management of measurement reporting after a cell change is provided. The apparatus may include at least one processor and at least one memory including computer program code. The at least one memory and the computer program code may be configured to, with the at least one processor, cause the apparatus to perform at least receiving a continuity indicator at a mobile terminal configured based on a measurement configuration employed with respect to a source cell, and determining, based on the continuity indicator, whether to continue providing measurement information to a target cell in accordance with the measurement configuration responsive to handover of the mobile terminal from the source cell to the target cell. The measurement configuration may be descriptive of reports for communication parameters measured at the mobile terminal based on transmissions associated with the source cell.

BRIEF DESCRIPTION OF THE DRAWING(S)

Having thus described the embodiments in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

As indicated above, some embodiments of the present invention may relate to the management of measurement reporting after a cell change. In this regard, for example, for a mobile terminal that is providing measurement information (e.g., for MDT) when a handover occurs for any reason, some embodiments of the present invention may enable the provision of instructions to the mobile terminal as to whether and how to continue reporting after the cell change is complete. MDT measurement reporting is typically done via radio resource control (RRC) signaling. For a mobile terminal that is in an active or connected mode, the reporting can be either immediate, corresponding to normal reporting principles for radio resource management purposes, or may be delayed such that, for example, reporting is delayed until a particular event trigger initiates a stored report to be sent (e.g., when in idle mode, reports may be stored and sent when a connection is set up in the future). The measurements reported may include data gathered by the mobile terminal as the mobile terminal moves throughout one or more cells for use in assessing network coverage or capacity, optimizing mobility parameters and other coverage or capacity related performance criteria. Accordingly, as referred to herein, MDT reports should be understood to correspond to any reports that may be provided from a mobile terminal to network devices to assist the network in managing or at least becoming aware of network coverage and capacity characteristics experienced at various locations in the network at which reporting devices are positioned.

Figure 1:
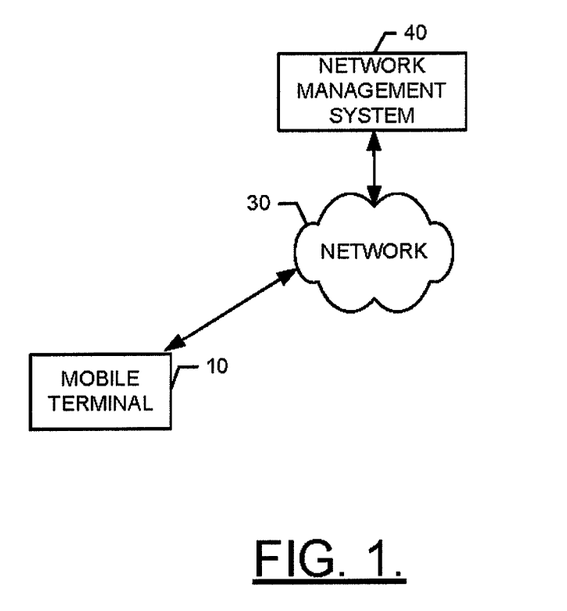
FIG. 1 is a schematic block diagram of a wireless communications system according to an example embodiment of the present invention.

FIG. 1 illustrates a generic system diagram in which a device such as a mobile terminal 10, which may benefit from embodiments of the present invention, is shown in an example communication environment. As shown in FIG. 1, a system in accordance with an example embodiment of the present invention includes a communication device (e.g., mobile terminal 10) that may be capable of communication with a network 30. The mobile terminal 10 may be an example of one of several communications devices of the system that may be able to communicate with network devices or with each other via the network 30. In some cases, various aspects of operation of the network 30 may be managed by one or more network devices. As an example, the network 30 may include a network management system 40, which may be involved with (perhaps among other things) performing network management functions. As such, the network management system 40 of an example embodiment may include mobility management and gateway functions as described in greater detail below.

While several embodiments of the mobile terminal 10 may be illustrated and hereinafter described for purposes of example, other types of mobile terminals, such as portable digital assistants (PDAs), pagers, mobile televisions, mobile telephones, gaming devices, laptop computers, cameras, camera phones, video recorders, audio/video player, radio, GPS devices, navigation devices, or any combination of the aforementioned, and other types of voice and text communications systems, can readily employ embodiments of the present invention.

In an example embodiment, the network 30 includes a collection of various different nodes, devices or functions that are capable of communication with each other via corresponding wired and/or wireless interfaces. As such, the illustration of FIG. 1 should be understood to be an example of a broad view of certain elements of the system and not an all inclusive or detailed view of the system or the network 30. Although not necessary, in some embodiments, the network 30 may be capable of supporting communication in accordance with any one or more of a number of first-generation (1G), second-generation (2G), 2.5G, third-generation (3G), 3.5G, 3.9G, fourth-generation (4G) mobile communication protocols, Long Term Evolution (LTE), and/or the like.

One or more communication terminals such as the mobile terminal 10 and other communication devices may be capable of communication with each other via the network 30 and each may include an antenna or antennas for transmitting signals to and for receiving signals from a base site, which could be, for example a base station that is a part of one or more cellular or mobile networks or an access point that may be coupled to a data network, such as a local area network (LAN), a metropolitan area network (MAN), and/or a wide area network (WAN), such as the Internet. In turn, other devices such as processing devices or elements (e.g., personal computers, server computers or the like) may be coupled to the mobile terminal 10 and the other communication devices via the network 30. By directly or indirectly connecting the mobile terminal 10 and the other communication devices to the network 30, the mobile terminal 10 and the other communication devices may be enabled to communicate with network devices and/or each other, for example, according to numerous communication protocols including Hypertext Transfer Protocol (HTTP) and/or the like, to thereby carry out various communication or other functions of the mobile terminal 10 and the other communication devices, respectively.

Furthermore, although not shown in FIG. 1, the mobile terminal 10 may communicate in accordance with, for example, radio frequency (RF), Bluetooth (BT), Infrared (IR) or any of a number of different wireline or wireless communication techniques, including LAN, wireless LAN (WLAN), Worldwide Interoperability for Microwave Access (WiMAX), WiFi, ultra-wide band (UWB), Wibree techniques and/or the like. As such, the mobile terminal 10 may be enabled to communicate with the network 30 and other devices by any of numerous different access mechanisms. For example, mobile access mechanisms such as wideband code division multiple access (W-CDMA), CDMA2000, global system for mobile communications (GSM), general packet radio service (GPRS) and/or the like may be supported as well as wireless access mechanisms such as WLAN, WiMAX, and/or the like and fixed access mechanisms such as digital subscriber line (DSL), cable modems, Ethernet and/or the like.

In an example embodiment, the network management system 40 may be a device, node or collection of devices and nodes such as a server, computer or other network device. The network management system 40 may have any number of functions or associations with various services. As such, for example, the network management system 40 may be a platform such as a dedicated server (or server bank) associated with a particular information source or service (e.g., network management services), or the network management system 40 may be a backend server associated with one or more other functions or services. As such, the network management system 40 represents a potential host for a plurality of different network management services. In some embodiments, the functionality of the network management system 40 is provided by hardware and/or software components configured to operate in accordance with known techniques for the provision of network management services to the network 30. However, at least some of the functionality provided by the network management system 40 may be provided in accordance with example embodiments of the present invention.

Figure 2:
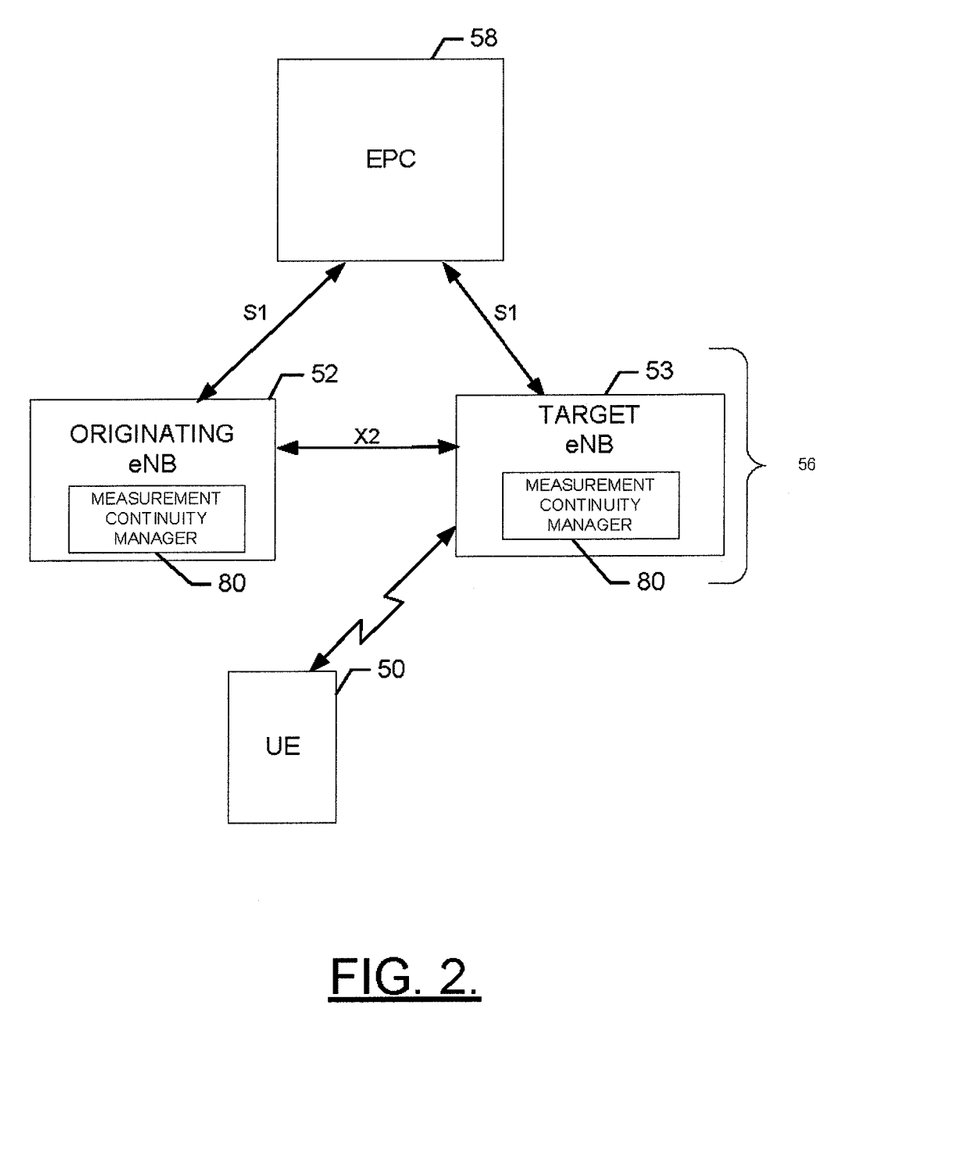
FIG. 2 is a schematic diagram showing a system for providing management of measurement reporting after a cell change according to an example embodiment of the present invention.

An example embodiment of the invention will now be described with reference to FIG. 2, in which certain elements of a system for providing management of measurement reporting after cell change are displayed. The system of FIG. 2 represents a specific embodiment of a network such as the general network displayed in FIG. 1, except that FIG. 2 represents a general block diagram of an E-UTRAN. As such, in connection with FIG. 2, user equipment (UE) 50 may be an example of one embodiment of the mobile terminal 10 of FIG. 1 and eNBs (E-UTRAN node Bs) 52 and 53 may be examples of base stations or access points that may serve respective cells or areas within the network 30 to, together with other eNBs, define the coverage provided by the network 30 to mobile users. However, it should be noted that the system of FIG. 2, may also be employed in connection with a variety of other devices, both mobile and fixed, and therefore, embodiments of the present invention should not be limited to application on devices such as the mobile terminal 10 of FIG. 1 or the network devices of FIG. 2. Moreover FIG. 2, which illustrates E-UTRAN components, should be understood to be just an example of one type of network with which embodiments of the present invention may be employed.

Referring now to FIG. 2, the system includes an E-UTRAN 56 which may include, among other things, a plurality of node-Bs in communication with an evolved packet core (EPC) 58 which may include one or more mobility management entities (MMEs) and one or more system architecture evolution (SAE) gateways. The node-Bs may be E-UTRAN node-Bs (e.g., eNBs such as originating eNB 52 and target eNB 53) and may also be in communication with the UE 50 and other UEs. The E-UTRAN 56 may be in communication with the EPC 58. In an example embodiment, the network management system 40 of FIG. 1 may be an example of a device or collection of devices within the EPC 58 that may be configured to employ an example embodiment of the present invention. In some embodiments, instances of a measurement continuity manager 80 may be present at each of the eNBs 52 and 53 to control continuity of measurements associated with MDT as described in greater detail below. However, it should be appreciated that in some embodiments, rather than employing instances of the measurement continuity manager 80 at each respective eNB, the EPC 58 may employ an instance of the measurement continuity manager 80 and direct operations of the eNBs accordingly.

The eNBs 52 and 53 may provide E-UTRA user plane and control plane (radio resource control (RRC)) protocol terminations for the UE 50. The eNBs 52 and 53 may provide functionality hosting for such functions as radio resource management, radio bearer control, radio admission control, connection mobility control, dynamic allocation of resources to UEs in both uplink and downlink, selection of an MME at UE attachment, IP header compression and encryption, scheduling of paging and broadcast information, routing of data, measurement and measurement reporting for configuration mobility, and the like.

The MME may host functions such as distribution of messages to respective node-Bs, security control, idle state mobility control, EPS (Evolved Packet System) bearer control, ciphering and integrity protection of (non access stratum) NAS signaling, and the like. The SAE gateway may host functions such as termination and switching of certain packets for paging and support of UE mobility. In an example embodiment, the EPC 58 may provide connection to a network such as the Internet. As shown in FIG. 2, the eNBs 52 and 53 may each include a measurement continuity manager 80 configured to execute functions associated with each corresponding eNB with respect to receiving information from and/or providing information to the UE 50, the EPC 58 and/or other eNBs related to, for example, communication format parameters and/or measurement parameters related to MDT.

Figure 3:
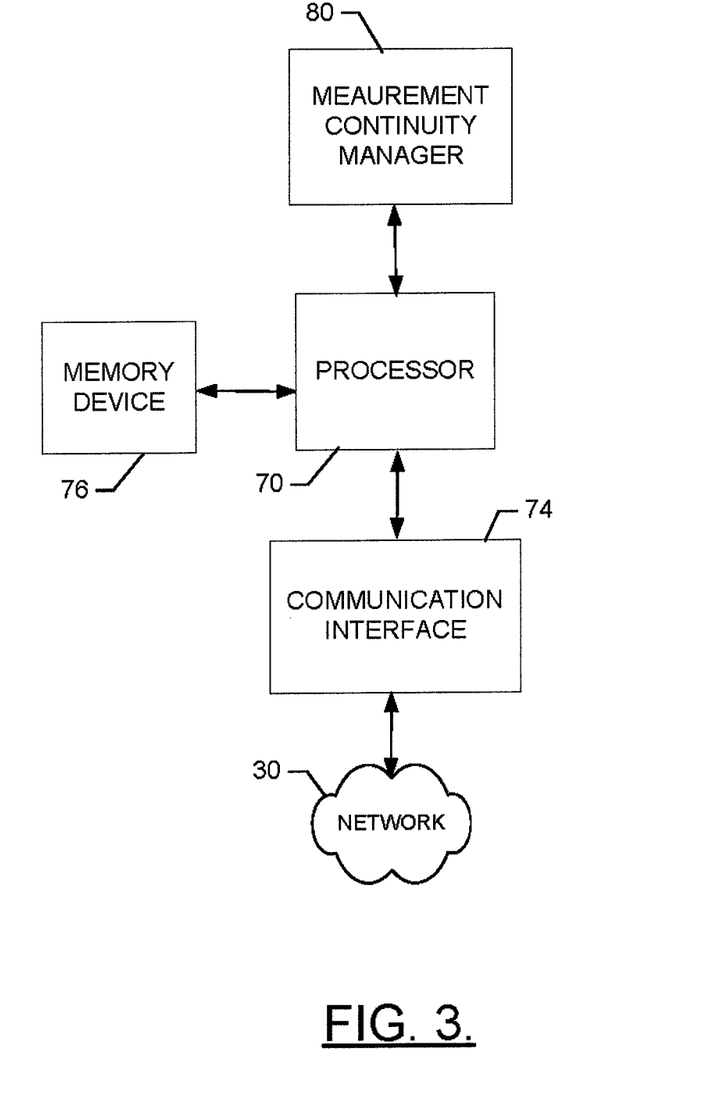
FIG. 3 is a block diagram of an apparatus for providing management of measurement reporting after a cell change according to an example embodiment of the present invention.

FIG. 3 illustrates a block diagram of an apparatus for providing management of measurement reporting after a cell change. The apparatus of FIG. 3 may be employed, for example, on the network management system 40 or on the eNBs 52 and 53. However, the apparatus may alternatively be embodied at a variety of other devices. In some cases, embodiments may be employed on either one or a combination of devices. Furthermore, it should be noted that the devices or elements described below may not be mandatory and thus some may be omitted in certain embodiments.

Referring now to FIG. 3, an apparatus for providing management of measurement reporting after a cell change is provided. The apparatus may include or otherwise be in communication with a processor 70, a communication interface 74 and a memory device 76. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device). The memory device 76 may be configured to store information, data, applications, instructions or the like for enabling the apparatus to carry out various functions in accordance with exemplary embodiments of the present invention. For example, the memory device 76 could be configured to buffer input data for processing by the processor 70. Additionally or alternatively, the memory device 76 could be configured to store instructions for execution by the processor 70.

The processor 70 may be embodied in a number of different ways. For example, the processor 70 may be embodied as one or more of various processing means such as a coprocessor, a microprocessor, a controller, a digital signal processor (DSP), a processing element with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, processing circuitry, or the like. In an exemplary embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to embodiments of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., the mobile terminal 10 or a network device) adapted for employing embodiments of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware, software, or a combination of hardware and software that is configured to receive and/or transmit data from/to a network and/or any other device or module in communication with the apparatus. In this regard, the communication interface 74 may include, for example, an antenna (or multiple antennas) and supporting hardware and/or software for enabling communications with a wireless communication network. In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

In an example embodiment, the processor 70 may be embodied as, include or otherwise control the measurement continuity manager 80. As such, in some embodiments, the processor 70 may be said to cause, direct or control the execution or occurrence of the various functions attributed to the measurement continuity manager 80 as described herein. The measurement continuity manager 80 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the measurement continuity manager 80 as described herein. Thus, in examples in which software is employed, a device or circuitry (e.g., the processor 70 in one example) executing the software forms the structure associated with such means.

The measurement continuity manager 80 may be configured to handle the provision of instructions to the UE 50 with respect to maintaining continuity of measurement reports (e.g., for MDT) after a cell handover has occurred. In this regard, when a handover occurs, the status of the mobile terminal 10 with regard to continuing MDT reporting may be uncertain since the mobile terminal 10 may not be aware of the capabilities of a new access point or eNB with respect to receiving and/or processing MDT reports. Similarly, the mobile terminal 10 may not be aware of the network's desire to receive reports in the new cell to which the handover is to occur. As such, for example, the measurement continuity manager 80 may handle communications between eNBs or other access points, in order to enable information to be exchanged and/or prompt notification of network requirements or plans for MDT reporting continuity. Moreover, by employing the measurement continuity manager 80, which operates at the network side instead of requiring resources to be consumed at the mobile terminal side, the UE 50 may be enabled to receive unambiguous direction regarding MDT function during a handover.

In an example embodiment, the measurement continuity manager 80 of the originating eNB 52 may provide information to the measurement continuity manager 80 of the target eNB 53. As such, although the originating eNB 52 and the target eNB 53 may each be referred to below as actors, it should be understood that the corresponding actions relating to MDT report management may be handled by the measurement continuity manager 80 at each respective eNB. In some examples, during handover preparation, the originating eNB 52 may provide information to the target eNB 53 regarding MDT measurements configured in the source cell (e.g., the cell of the originating eNB 52). In an example embodiment, the information may be provided in a handover request message. As such, parameters including information descriptive of the MDT measurement configuration of the originating eNB 52 may be provided in the handover request message. Information descriptive of the MDT measurement configuration of the originating eNB 52 may therefore be shared in the same way that other radio resource management related configuration parameters are transferred between eNBs over the X2 interface.

In some embodiments, if the target eNB 53 does not support MDT measurements, the target eNB 53 may ignore the information descriptive of the MDT measurement configuration of the originating eNB 52. In situations in which the target eNB 53 supports MDT measurements, the information descriptive of the MDT measurement configuration of the originating eNB 52 may include an indication as to whether MDT measurement is active (either for the corresponding cell or for the corresponding UE being handed over). Activation of the MDT function may typically be activated from the network management system (e.g., an entity in the EPC 58). Thus, if the target eNB 53 is to be activated for the same MDT measurements that were previously being provided, the target eNB may continue to receive reports regarding the same MDT measurements from the entering terminal (e.g., the UE 50 being handed over) after the handover is successfully completed.

From point of view of the UE 50, MDT control may therefore be handled on the network side in order to simplify UE 50 operation and resulted implementation. Hence, the target eNB 53 may explicitly indicate whether the UE 50 is to continue to make, record and/or report the previous MDT measurements that had been provided to the originating eNB 52. In an exemplary embodiment, the measurement continuity manager 80 of the target eNB 53 may provide a continuity indicator to the UE 50 to indicate whether the UE 50 is to continue with MDT measurements and reports. If no continuity indicator is sent by the target eNB 53 to the UE 50, the UE 50 may assume that MDT measurement is not required. Thus, for example, MDT measurement and reporting based on the configuration done in the previous cell (e.g., the cell associated with the originating eNB 52) may be stopped. In general, failure of the target eNB 53 to send the continuity indicator may be due to non-existing support for the MDT measurement in the new cell or due to the new cell not being an area of interest for MDT measurement. For example, if measurements for optimization of coverage for the new cell have already been verified as being satisfactory, no further measurements may be deemed to be necessary.

The continuity indicator may be implemented in several ways. In some cases, MDT measurement configuration information may be provided in a RRCConnectionReconf message (see FIG. 5) that may be provided to the target eNB 53 from the originating eNB 52. This may be done, for example, in cases in which the target eNB 53 is instructed to carry out MDT measurements for the same use case or purpose as such measurements were being conducted in the originating eNB 53. Such instructions are assumed to be coming from the network management system. As an alternative, the continuity indicator may be provided via a flag or indicator bit (or set of bits) indicating a request for the MDT measurements to be continued using the previous measurement configuration (e.g., of the originating eNB 52). The use of a flag or indicator bit may reduce or even minimize the signaling load after handover (e.g., since signal level or quality may be relatively low at cell edges). The use of a flag or indicator bit may also remove unnecessary repetition of sending MDT configuration information and may remove some sources for possible errors. The flag or indicator bit may also easily fit into the RRCConnectionReconf message or another type of configuration message.

By employing the measurement continuity manager 80, decisions regarding whether to perform MDT measurements and the notifications associated therewith may be controlled from the network side so that the UE 50 simply can respond to instructions/commands coming from a network entity (e.g., the measurement continuity manager 80 of the originating eNB 52). The network may therefore have knowledge of which MDT related measurements (for certain use cases) are to be carried out in different parts of the radio network and how many (and perhaps also which) terminals are to be tasked with reporting (e.g., by activating MDT reporting). Accordingly, it is unlikely that all terminals would continue MDT measurements after handover. Thus, embodiments of the present invention may enable management of the reporting to be provided without increasing complexity and resource consumption at the more resource limited end, which is the mobile terminal 10 or UE 50 end.

In some situations, there could be cases in which the UE 50 may continue making MDT measurements even without explicit command to do so from the target eNB 53. In this regard, the source cell or another previous cell (e.g., of the current or a previous originating eNB) may include information about the MDT area where the configured measurement(s) are to be active. In a simple case, the area may be defined by a list of cell identities (e.g., cell IDs) where the same MDT configurations are to be considered effective. Such eNB configuration may be provided from network management system components that are responsible for MDT activation and data collection. Accordingly, the same information can be assumed to be sent to all cells listed among the cell IDs of the MDT area list. Therefore, the UE 50 may be enabled to assume, when entering a cell having a cell ID matching with one of the listed IDs, that the target cell is MDT capable and, that the MDT measurement and reporting can be continued without explicit command from the target cell. Even though being an exception to the general rule, the main principles are still used, e.g., to keep the control on the network side and maintain unambiguous operation with minimized complexity and signaling increase.

In some cases, there could be alternative definitions for the MDT area (in addition to the cell ID list), e.g. location-, routing- or tracking area, but this is just a matter of implementation and can be a subject for further optimization. By using an example embodiment, the UE 50 may be prevented from performing unnecessary logging of data when there may otherwise be no possibility for reporting measured results to the network.

Figure 4:
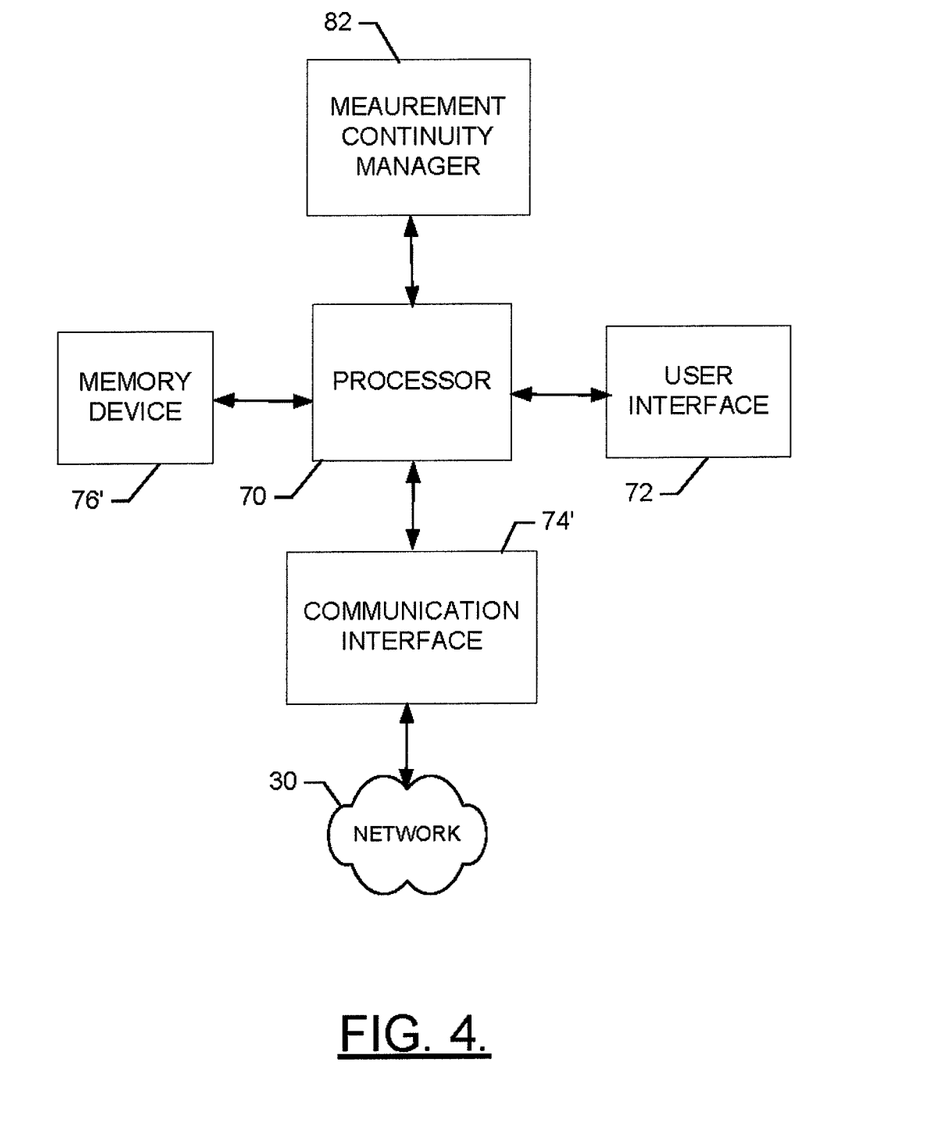
FIG. 4 is a block diagram of an apparatus embodied at a mobile terminal for providing management of measurement reporting after a cell change according to an example embodiment of the present invention.

FIG. 4 shows a block diagram view of one example of a terminal side apparatus configured to perform example embodiments of the present invention. In this regard, for example, the apparatus may include or otherwise be in communication with a processor 70', a user interface 72, a communication interface 74' and a memory device 76'. The processor 70', the communication interface 74' and the memory device 76' may be substantially similar in function and basic structure (with perhaps semantic and/or scale differences in some cases) to the descriptions provided above for the processor 70, the communication interface 74 and the memory device 76 of the network side apparatus. Thus, descriptions of these components will not be repeated.

The user interface 72 may be in communication with the processor 70' to receive an indication of a user input at the user interface 72 and/or to provide an audible, visual, mechanical or other output to the user. As such, the user interface 72 may include, for example, a keyboard, a mouse, a joystick, a display, a touch screen, soft keys, a microphone, a speaker, or other input/output mechanisms. In some examples, the processor 70' may comprise user interface circuitry configured to control at least some functions of one or more elements of the user interface, such as, for example, a speaker, ringer, microphone, display, and/or the like. The processor 70' and/or user interface circuitry comprising the processor 70' may be configured to control one or more functions of one or more elements of the user interface through computer program instructions (e.g., software and/or firmware) stored on a memory accessible to the processor 70' (e.g., memory device 76', and/or the like).

In an example embodiment, the processor 70' may be embodied as, include or otherwise control a terminal side instance of a continuity measurement manager 82. As such, in some embodiments, the processor 70' may be said to cause, direct or control the execution or occurrence of the various functions attributed to the continuity measurement manager 82 as described herein. In an example embodiment, the continuity measurement manager 82 may be configured to receive a continuity indicator at a mobile terminal (e.g., mobile terminal 10) configured based on a measurement configuration employed with respect to a source cell. The method may further include determining, based on the continuity indicator, whether to continue providing measurement information to a target cell in accordance with the measurement configuration responsive to handover of the mobile terminal from the source cell to the target cell. The measurement configuration may be descriptive of reports for communication parameters measured at the mobile terminal based on transmissions associated with the source cell.

Figure 5:
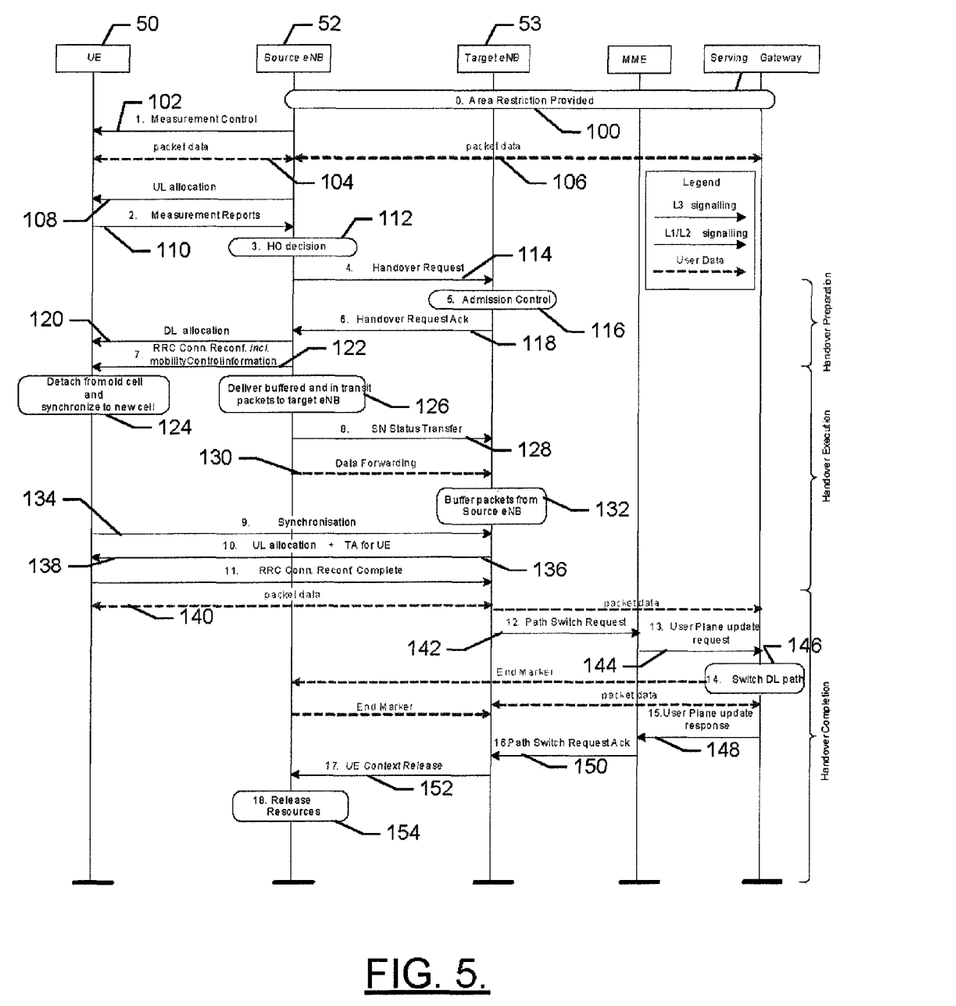
FIG. 5 is a control flow diagram illustrating a mechanism for providing management of measurement reporting after a cell change according to an example embodiment of the present invention.

FIG. 5 illustrates a control flow diagram of signal flow during a handover conducted according to an example embodiment. As shown in FIG. 5, the UE 50 may interact with the originating eNB 52 (referred to as source eNB in FIG. 5) and the target eNB 53, each of which may communicate with elements of the EPC 58 (such as the MME and Serving Gateway). As shown in FIG. 5, area restrictions may initially be defined by the network at operation 100. The area restrictions may define for which cells it is desirable to receive MDT measurements and perhaps also an indication of the number of devices from which such reports may be desirable. At operation 102, measurement control data may be provided to the UE 50, which the UE 50 may measure. Packet data may be exchanged between the UE 50 and the source eNB at operation 104, and between the source eNB and the serving gateway at operation 106. The source eNB may also provide uplink (UL) allocation information to the UE 50 at operation 108. At operation 110, the UE 50 may provide measurement reports to the source eNB based on the measurements made of the measurement control data. At operation 112, a handover decision may be made by the source eNB (e.g., due to loss of signal strength or other factors). The source eNB may then communicate a handover request to the target eNB 53 at operation 114. The handover request may include information regarding the MDT measurement configuration of the source eNB. The target eNB 53 may conduct admission control at operation 116 and send a handover request acknowledgement to the source eNB at operation 118. The source eNB may then provide a downlink allocation to the UE 50 at operation 120 and provide an RRC connection reconfirmation message to the UE 50 at operation 122. As indicated above, the RRC connection reconfirmation message (e.g., RRCConnectionReconf message) may include a continuity indicator. Responsive to the RRCConnectionReconf message, the UE may detach from the source eNB and synchronize with the target eNB 53 at operation 124. Buffered and in transit packets may then be delivered from the source eNB to the target eNB 53 at operation 126. Transfer status information and data may then be forwarded at operations 128 and 130, respectively, so that buffered packets may be received from the source eNB at the target eNB 53 at operation 132. At operation 134, the UE 50 may synchronize to the target eNB 53 and the target eNB 53 may then provide the UE 50 with uplink allocation at operation 136. The UE 50 may provide an RRC connection reconf complete message to the target eNB at operation 138, after which packet data may be exchanged as indicated by arrows associated with operation 140. In some cases, the target eNB 53 may provide a path switch request to the MME at operation 142 and the MME may provide a user plane update request at operation 144. Downlink paths may then be switched at operation 146. The serving gateway may then provide a user plane update response at operation 148 and the MME may provide the target eNB 53 with a path switch request acknowledgment at operation 150. The target eNB 53 may then provide a UE context release message to the source eNB at operation 152 and the resource of the source eNB may be released at operation 154. After the handover, the UE 50 may provide MDT measurement reports according to the continuity indicator.

Accordingly, in some embodiments, the measurement continuity manager 80 of the target eNB 53 may be configured to receive information indicative of the MDT measurement configuration employed by the originating eNB 52 (or source eNB). The target eNB 53 may therefore be enabled to receive MDT measurements from the UE 50 after handover based on instructions provided to the UE 50 in the form of a continuity indicator and the MDT measurement configuration employed by the originating eNB 52. The measurement continuity manager 80 of the originating eNB 52 may be configured to receive an indication that a handover is to be conducted and may provide information indicative of the MDT measurement configuration employed by the originating eNB 52 (or source eNB) to the target eNB 53. The measurement continuity manager 80 of the originating eNB 52 may also be configured to communicate (or cause the communication of) the continuity indicator to the UE 50 to indicate to the UE 50 whether to continue MDT measurements and/or reports to the target eNB based on the MDT measurement configuration employed with respect to the originating eNB 52 (or source eNB).

Some embodiments of the present invention may provide a relatively straightforward and simple mechanism by which to manage MDT functionality for mobile terminals that are handed over between cells. In this regard, mobile terminal complexity may be reduced by managing MDT functionality from the network side by providing a continuity indicator from the network to the handed over mobile terminal. The continuity indicator, which may be provided by the originating or source cell, may be used to indicate whether the mobile terminal is to continue with MDT measurement and/or reporting in the new or target cell in the same manner as was performed for the source cell. The source cell may communicate with the target cell to determine whether the target cell has MDT measurement capability and may indicate that MDT measurement should continue based on input from a network management system and/or a predefined listing of cell IDs for which reporting and measuring is to be conducted. The communication between cells may occur via existing interfaces between cells (e.g., the X2 interface between eNBs) and using existing messages (e.g., RRC messages). Accordingly, for example, unnecessary logging of data at the mobile terminal may be avoided when measurement reporting is no longer valid or required or when the target cell does not support MDT measurement.

Figure 6:
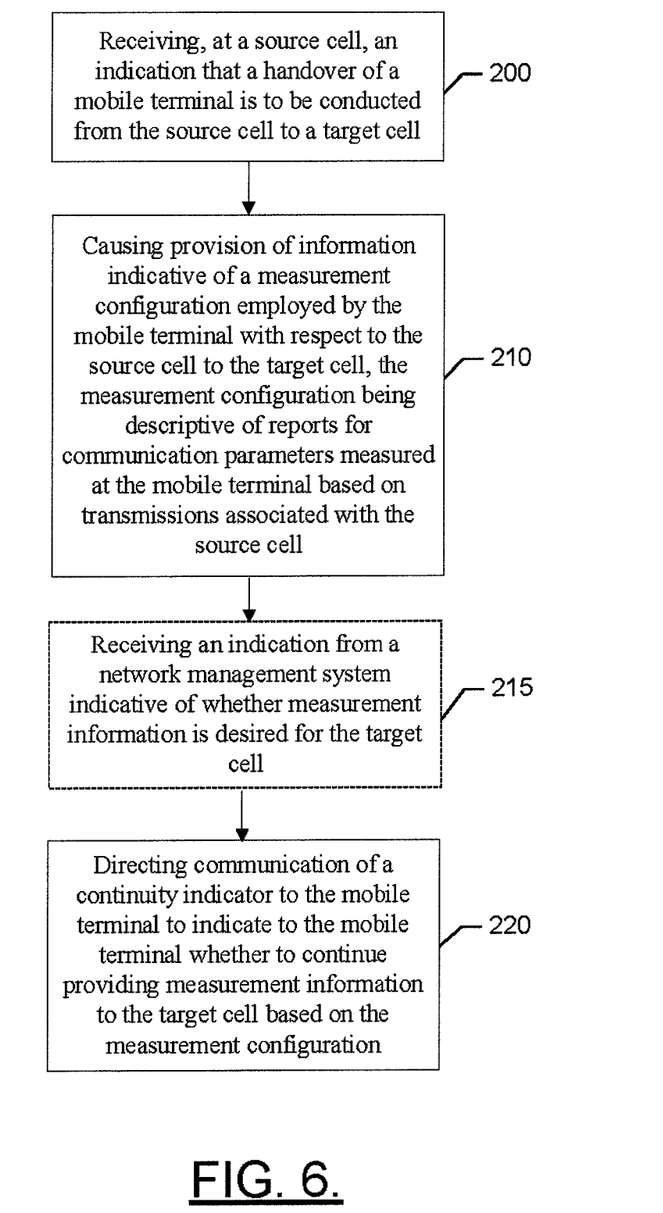
FIG. 6 is a flowchart according to an example method for providing management of measurement reporting after a cell change according to an example embodiment of the present invention.
Figure 7:
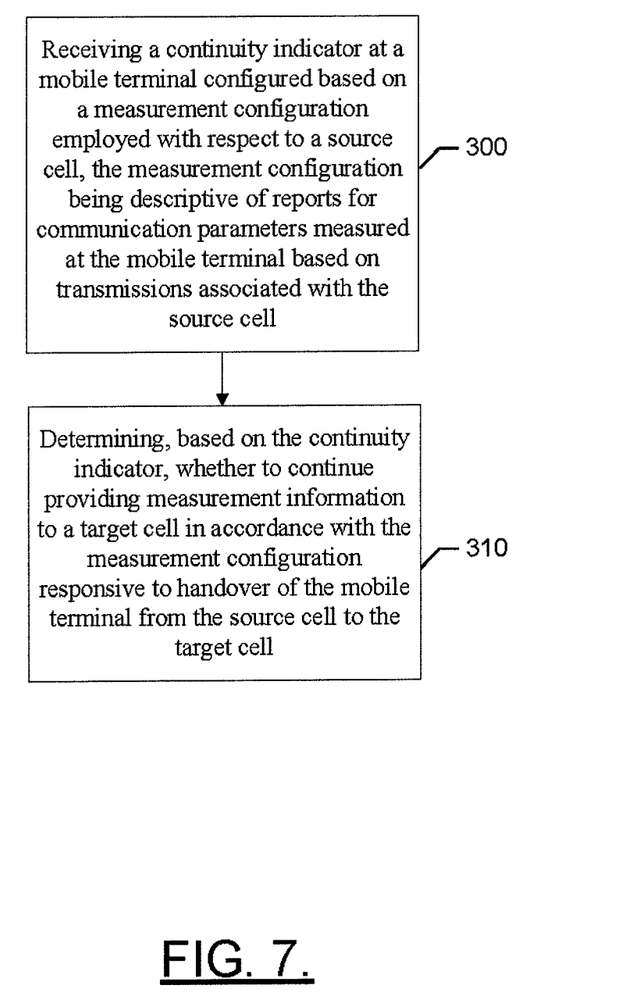
FIG. 7 is a flowchart according to an example method for providing management of measurement reporting after a cell change from a mobile terminal perspective according to an example embodiment of the present invention.

FIGS. 6 and 7 are flowcharts of a method and program product according to example embodiments of the invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of the mobile terminal or network device and executed by a processor in the mobile terminal or network device. As will be appreciated, any such computer program instructions may be loaded onto a computer or other programmable apparatus (e.g., hardware) to produce a machine, such that the instructions which execute on the computer or other programmable apparatus create means for implementing the functions specified in the flowcharts block(s). These computer program instructions may also be stored in a computer-readable memory that may direct a computer or other programmable apparatus to function in a particular manner, such that the instructions stored in the computer-readable memory produce an article of manufacture including instruction means which implement the function specified in the flowcharts block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowcharts block(s).

Accordingly, blocks of the flowchart support combinations of means for performing the specified functions, combinations of operations for performing the specified functions and program instruction means for performing the specified functions. It will also be understood that one or more blocks of the flowchart, and combinations of blocks in the flowcharts, can be implemented by special purpose hardware-based computer systems which perform the specified functions, or combinations of special purpose hardware and computer instructions.

In this regard, a method according to one embodiment of the invention, as shown in FIG. 6, may include receiving, at a source cell, an indication that a handover of a mobile terminal is to be conducted from the source cell to a target cell at operation 200. The method may further include causing provision of information indicative of a measurement configuration employed by the mobile terminal with respect to the source cell to the target cell in which the measurement configuration is descriptive of reports for communication parameters measured at the mobile terminal based on transmissions associated with the source cell at operation 210. The method may further include directing communication of a continuity indicator to the mobile terminal to indicate to the mobile terminal whether to continue providing measurement information to the target cell based on the measurement configuration at operation 220.

In some embodiments, certain ones of the operations above may be modified or further amplified as described below. Moreover, in some embodiments additional optional operations may also be included (an example of which is shown in dashed lines in FIG. 6). It should be appreciated that each of the modifications, optional additions or amplifications below may be included with the operations above either alone or in combination with any others among the features described herein. In this regard, for example, the method may further include receiving an indication from a network management system indicative of whether measurement information is desired for the target cell at operation 215. In some embodiments, directing communication of the continuity indicator may include directing communication of a flag or an indicator bit indicating whether to continue providing measurement information. In an example embodiment, directing communication of the continuity indicator may include directing communication of the continuity indicator based on whether the target cell is in a predefined list of cells for which measurement information is desired. In some cases, causing provision of information indicative of the measurement configuration may include causing provision of information indicative of a configuration for reports relating to minimization of drive test (MDT) measurements and/or directing communication of a handover request message including the measurement configuration.

In an example embodiment, an apparatus for performing the method of FIG. 6 above may comprise a processor (e.g., the processor 70) configured to perform some or each of the operations (200-220) described above. The processor may, for example, be configured to perform the operations (200-220) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 200-220 may comprise, for example, the processor 70, the measurement continuity manager 80, and/or a device or circuit for executing instructions or executing an algorithm for processing information as described above.

In another example embodiment of the invention, as shown in FIG. 7, the method may include receiving a continuity indicator at a mobile terminal configured based on a measurement configuration employed with respect to a source cell at operation 300, and determining, based on the continuity indicator, whether to continue providing measurement information to a target cell in accordance with the measurement configuration responsive to handover of the mobile terminal from the source cell to the target cell at operation 310. The measurement configuration may be descriptive of reports for communication parameters measured at the mobile terminal based on transmissions associated with the source cell.

In an example embodiment, an apparatus for performing the method of FIG. 7 above may comprise a processor (e.g., the processor 70') configured to perform some or each of the operations (300-310) described above. The processor may, for example, be configured to perform the operations (300-310) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 300-310 may comprise, for example, the processor 70', the measurement continuity manager 82, and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
receiving, at a source cell, an indication that a handover of a mobile terminal is to be conducted from the source cell to a target cell;
causing, at the source cell, provision of information indicative of a measurement configuration employed by the mobile terminal with respect to the source cell to the target cell, the measurement configuration being descriptive of reports for communication parameters measured at the mobile terminal based on transmissions associated with the source cell; and
directing, at the source cell, communication of a continuity indicator to the mobile terminal to indicate to the mobile terminal whether to continue providing measurement information to the target cell based on the measurement configuration, wherein the continuity indicator is generated by the source cell.

2. The method of claim 1, further comprising receiving an indication from a network management system indicative of whether measurement information is desired for the target cell.

3. The method of claim 1, wherein directing communication of the continuity indicator comprises directing communication of the continuity indicator based on whether the target cell is in a predefined list of cells for which measurement information is desired.

4. The method of claim 1, wherein causing provision of information indicative of the measurement configuration comprises causing provision of information indicative of a configuration for reports relating to minimization of drive test measurements.

5. The method of claim 1, wherein causing provision of information indicative of the measurement configuration comprises directing communication of a handover request message including the measurement configuration.

6. An apparatus comprising at least one processor and at least one memory including computer program code, the at least one memory and the computer program code configured to, with the processor, cause the apparatus to at least:
receive, at a source cell, an indication that a handover of a mobile terminal is to be conducted from the source cell to a target cell;
cause, at the source cell, provision of information indicative of a measurement configuration employed by the mobile terminal with respect to the source cell to the target cell, the measurement configuration being descriptive of reports for communication parameters measured at the mobile terminal based on transmissions associated with the source cell; and
direct, at the source cell, communication of a continuity indicator to the mobile terminal to indicate to the mobile terminal whether to continue providing measurement information to the target cell based on the measurement configuration, wherein the continuity indicator is generated by the source cell.

7. The apparatus of claim 6, wherein the at least one memory and the computer program code are further configured to, with the processor, cause the apparatus to perform at least receiving an indication from a network management system indicative of whether measurement information is desired for the target cell.

8. The apparatus of claim 6, wherein the at least one memory and the computer program code are configured to, with the processor, cause the apparatus to direct communication of the continuity indicator by directing communication of the continuity indicator based on whether the target cell is in a predefined list of cells for which measurement information is desired.

9. The apparatus of claim 6, wherein the at least one memory and the computer program code are configured to, with the processor, cause the apparatus to cause provision of information indicative of the measurement configuration by causing provision of information indicative of a configuration for reports relating to minimization of drive test measurements.

10. The apparatus of claim 6, wherein the at least one memory and the computer program code are configured to, with the processor, cause the apparatus to cause provision of information indicative of the measurement configuration by directing communication of a handover request message including the measurement configuration.

11. The apparatus of claim 6, wherein the indication comprises a complete minimization of drive test measurement configuration.

12. The apparatus of claim 6, wherein the continuity indicator is provided in a radio resource control message.

13. The apparatus of claim 6, wherein the measurement configuration is provided from the source cell to the target cell via a handover request message.

14. A method comprising:
receiving, from a source cell, a continuity indicator at a mobile terminal configured based on a measurement configuration employed with respect to the source cell, the measurement configuration being descriptive of reports for communication parameters measured at the mobile terminal based on transmissions associated with the source cell, wherein the continuity indicator is generated by the source cell;
determining, based on the continuity indicator, whether to continue providing measurement information to a target cell in accordance with the measurement configuration responsive to handover of the mobile terminal from the source cell to the target cell.

15. The method of claim 14, wherein receiving the continuity indicator comprises receiving instructions regarding provision of reports relating to minimization of drive test measurements.

16. The method of claim 14, wherein receiving the continuity indicator comprises receiving the continuity indicator in a radio resource control message.

17. An apparatus comprising at least one processor and at least one memory including computer program code, the at least one memory and the computer program code configured to, with the processor, cause the apparatus to at least:
receive, from a source cell, a continuity indicator at a mobile terminal configured based on a measurement configuration employed with respect to the source cell, the measurement configuration being descriptive of reports for communication parameters measured at the mobile terminal based on transmissions associated with the source cell, wherein the continuity indicator is generated by the source cell;
determine, based on the continuity indicator, whether to continue providing measurement information to a target cell in accordance with the measurement configuration responsive to handover of the mobile terminal from the source cell to the target cell.

18. The apparatus of claim 17, wherein the at least one memory and the computer program code are configured to, with the processor, cause the apparatus to receive the continuity indicator by receiving a flag or an indicator bit indicating whether to continue providing measurement information.

19. The apparatus of claim 17, wherein the at least one memory and the computer program code are configured to, with the processor, cause the apparatus to receive the continuity indicator by receiving instructions regarding provision of reports relating to minimization of drive test measurements.

20. The apparatus of claim 17, wherein the at least one memory and the computer program code are configured to, with the processor, cause the apparatus to receive the continuity indicator by receiving the continuity indicator in a radio resource control message.

* * * * *